(No Model.) 6 Sheets—Sheet 1.

J. SCHUMACHER.
DEVICE FOR PREVENTING FRAUDULENT REUSE OF BOTTLES.

No. 581,432. Patented Apr. 27, 1897.

(No Model.) 6 Sheets—Sheet 2.

J. SCHUMACHER.
DEVICE FOR PREVENTING FRAUDULENT REUSE OF BOTTLES.

No. 581,432. Patented Apr. 27, 1897.

Witnesses
W. C. Coulies
Martin H. Olsen

Inventor
John Schumacher
By his attorneys
Gridley & Hopkins (No Model.) 6 Sheets—Sheet 3.

J. SCHUMACHER.
DEVICE FOR PREVENTING FRAUDULENT REUSE OF BOTTLES.

No. 581,432. Patented Apr. 27, 1897.

(No Model.) 6 Sheets—Sheet 4.

J. SCHUMACHER.
DEVICE FOR PREVENTING FRAUDULENT REUSE OF BOTTLES.

No. 581,432. Patented Apr. 27, 1897.

(No Model.) 6 Sheets—Sheet 6.

J. SCHUMACHER.
DEVICE FOR PREVENTING FRAUDULENT REUSE OF BOTTLES.

No. 581,432. Patented Apr. 27, 1897.

Witnesses
W. C. Corlies
Martin A. Oken

Inventor
John Schumacher
By his attorneys
Gridley & Hopkins

UNITED STATES PATENT OFFICE.

JOHN SCHUMACHER, OF CHICAGO, ILLINOIS.

DEVICE FOR PREVENTING FRAUDULENT REUSE OF BOTTLES.

SPECIFICATION forming part of Letters Patent No. 581,432, dated April 27, 1897.

Application filed June 11, 1896. Serial No. 595,140. (No model.)

*To all whom it may concern:*

Be it known that I, JOHN SCHUMACHER, a citizen of the United States, residing at Chicago, in the county of Cook and State of Illinois, have invented certain new and useful Improvements in Devices for Preventing the Fraudulent Reuse of Bottles or Similar Receptacles, of which the following is a specification.

The object of the present invention is to provide a device of such construction that it will either positively prevent or effectually discourage the reuse of a bottle or similar receptacle after a quantity of liquid equal to the full capacity of the receptacle has been discharged from it.

Many patents have been issued for devices whose object is to prevent the fraudulent reuse of bottles. So far as I am aware the inventors of all these patented devices have proceeded upon the theory that the only way to accomplish this object is to positively prevent any liquid from being admitted to the receptacle. The conditions to be met by a device operating upon this principle are such, however, that it is extremely difficult to construct a device that will meet them. I have proceeded upon the theory that it is immaterial what quantity of liquid is admitted to the receptacle, the material fact being the quantity of liquid that is discharged from it. Following out this theory I have invented and produced a device which not only does not aim to at all times prevent liquid from being admitted to the receptacle, but which on the contrary admits it freely, (some forms of the device admitting it at all times and others until certain conditions hereinafter described are established,) said device being of such construction that upon the happening of a definitive fact it will establish a condition which will positively prevent liquid from being discharged from the receptacle, or destroy the commercial value of the liquid remaining in the receptacle, or show that it is not genuine, or break the receptacle, or otherwise prevent its further use for dispensing purposes. The definitive fact above referred to is the discharging of a quantity of liquid equal to the full capacity of the receptacle. If the conditions which govern the discharge of liquid from a number of receptacles are similar, the length of time required for discharging a given quantity of liquid from one of them will not differ appreciably from the length of time required for discharging the same quantity of liquid from another of them. I have taken cognizance of this fact and have associated with the receptacle a time mechanism which is constructed and arranged so that it is adapted to operate a definite length of time, and I have associated with this time mechanism a device upon which it operates, so that at the expiration of the definite length of time aforesaid said device will bring about or cause to be brought about conditions that will either prevent or deter the reuse of the receptacle, as aforesaid. Theoretically the time mechanism should operate for exactly the same length of time that is required to completely empty the receptacle of its contents, but in practice it is arranged to operate for a slightly-greater length of time in order to insure the complete emptying of the receptacle before the device "fires."

The device is also provided with means under the control of the operator for preventing the operation of the time mechanism during the existence of certain conditions. The conditions here referred to are the conditions under which it is necessary that the operation of the time mechanism be prevented in order that the objects of the invention may be accomplished and not defeated. For example, it is necessary that the time mechanism be prevented from operating while the goods are stored or are in transit or are being handled for purposes that do not have for their object an alteration in the quantity of the liquid contained in the receptacle. To this end I prefer to provide means under the control of the operator for closing the discharge-opening of the receptacle when it is desired to do so, and I so relate this closure to the time mechanism that when the discharge-opening is thus closed the time mechanism will be prevented from operating, the nature of the relation being such, however, that the time mechanism will be conditioned to operate immediately upon the establishing of the conditions that are necessary to discharging the contents of the receptacle, the conditions here referred to being the opening of the discharge-opening and the tipping of the receptacle.

With some classes of goods it is necessary that the operation of the time mechanism be arrested before it has operated the definite length of time aforesaid. For example, with whiskies, brandies, and many other liquids it is not the practice to pour out the entire contents of the receptacle at one operation. Usually part of it is poured out at one operation, part at another operation, and so on, a greater or less interval of time being allowed to elapse between the successive operations. With goods of this class the accomplishing of the objects of the invention makes it necessary that the operation of the time mechanism be arrested the instant the pouring ceases and that its operation shall not be again resumed until the pouring is resumed. It is in order to meet these conditions that the time mechanism is provided with means for arresting its own operation before it has operated the definite length of time aforesaid.

The accomplishing of the objects of the invention makes it necessary to provide also means for preventing the operator from interfering with or preventing the operation of the time mechanism while the contents of the receptacle are being discharged and for preventing the resetting of the time mechanism either before or (in some instances) after the time mechanism has operated the definite length of time aforesaid.

Preferably the time mechanism includes a spring under tension and means under the control of an escapement for confining the spring for the definite length of time aforesaid, so that at the expiration of said time the escapement will cause the spring to be released, whereupon it will operate upon the device aforesaid for preventing or deterring the reuse of the receptacle. With this arrangement the operation of the spring is instantaneous, but, if desired, the construction and arrangement may be such that the spring is operating simultaneously with the operation of the escapement. Preferably, also, the escapement consists of a quantity of some finely-divided solid substance—such, for example, as fine sand—which is allowed to run from one chamber or compartment to another under the conditions hereinafter described and which controls the movement of a spring-actuated follower, but I desire to have it understood that in its broadest aspect the invention is not limited thereto, but on the contrary comprehends any escapement device so constructed and arranged that it will do its part in accomplishing the results herein described.

I believe myself to be the first to provide a bottle or similar receptacle with time mechanism, without regard to the details of its construction, for accomplishing the results herein described, and I therefore desire to have it understood that the present invention is not limited to a time mechanism of any particular construction, but on the contrary includes any mechanism that will accomplish said results, and hence the present specification and claims are to be construed as including and covering the greatest possible range of equivalents. Nor is the invention in its broadest aspect limited to the construction or character of the device upon which the time mechanism operates. This device may be in the nature of a valve which is seated after the time mechanism has operated the definite length of time aforesaid and which is thereafter held permanently seated; or it may be in the nature of a frangible object which is shattered by the time mechanism, so that its particles will be deposited in the receptacle; or it may be in the nature of a receptacle or chamber which contains a coloring-matter or other foreign substance, which chamber or receptacle is opened by the time mechanism, so as to discharge the said coloring-matter or other foreign substance within the receptacle; or it may be in the nature of a frangible or movable device which is broken or moved by the time mechanism, so as to disclose a telltale inscription; or it may be in the nature of a projectile which the time mechanism throws against the bottle with sufficient force to break it; or it may be any other device of such nature that when acted upon by the time mechanism it will either prevent or effectually deter the reuse of the receptacle. Again, I reserve the right to use two or more of these devices, and in the preferred form of the invention I do use all the devices above specifically enumerated, excepting the projectile.

Another feature of the invention resides in a liquid-tight shell or casing in which all of the working parts are contained.

With these preliminary remarks as to the nature of my invention and as to what I believe to be its scope, I will proceed to describe it with reference to the accompanying drawings, which are made a part of this specification, and in which—

Figs. 3, 4, and 5 are on a larger scale than Figs. 1 and 2. These figures show the parts in their initial positions and the discharge-opening of the receptacle closed. Figs. 1 to 8 inclusive, show the invention in its preferred form. Fig. 17$^a$ is a horizontal section thereof on the line 17$^a$ 17$^a$, Fig. 17, looking in the direction of the arrows.

Figure 1:
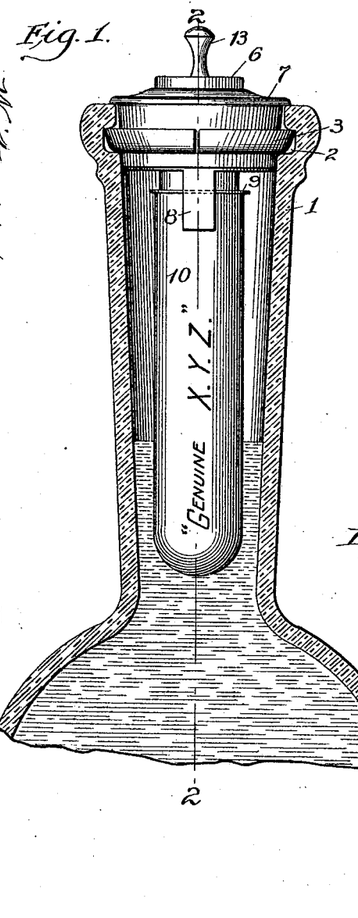
Figure 1 is a vertical section of the upper portion of a bottle and an elevation of a device embodying the invention in place therein.

The neck 1 of the bottle is provided on its interior near its mouth with an annular groove 2, in which fits a spring-ring 3, by which all of the devices hereinafter described are permanently secured within the neck of the bottle. In its preferred form this ring is split, as shown in Fig. 1, and its interior flares outward. At its lower edge its normal diameter is slightly less than the diameter of a shoulder 4, formed on a metallic cap 5, so that if the spring-ring be first placed in the groove and the cap then inserted it will expand it sufficiently to permit the shoulder 4 to pass, after which the spring-ring will contract to its normal diameter and engage the top side of the shoulder. Thus the cap is permanently secured in place. I am aware that it is not broadly new to use a spring-ring for this purpose, but so far as I am aware it has never been proposed to use a spring-ring which flares, as described, and whose normal diameter is less than the diameter of the shoulder which it engages, so that the parts may be assembled in the manner described.

The cap 5 has a central opening in which fits the neck 6 of a ring 7, the exterior of which conforms to the interior of the cap. The cap 5 is preferably made of sheet metal and the ring 7 of wood, and they are permanently secured together by some suitable means which will positively prevent the ring from being forced inward. For this purpose I may form spurs 7$^a$ on the cap by subjecting it to the action of a punch. Proceeding downward from the ring 7 is one or more tongues 8, each of which is provided on its interior with a groove for receiving a flange 9 on the upper end of a shell 10, which latter is preferably of cylindrical shape and is closed at bottom. Preferably it is made of opaque glass or some other frangible material and bears upon its exterior an inscription attesting the genuineness of the contents of the receptacle. With this arrangement the shell will be supported in a fixed position with relation to the neck of the bottle. The ring 7 is provided on its interior with a seat 11 for a stopper 12, having a stem 13, which projects far enough to enable the operator to grasp it and move the stopper to and from its seat, this stopper being shown seated in Figs. 1 and 2 and unseated in Figs. 6 and 7.

14 is a sheet-metal tube closed at its upper end and provided at its lower end with an internal flange 15, which engages an external flange 16, formed on the upper end of a hollow part 17, hereinafter called a "barrel." This barrel is closed at the bottom save for an opening through which passes the stem 18 of a follower 19, which occupies the lower portion of the tube 14, the joint between the follower and tube being closed by a packing 20 of soft rubber, felt, or some other suitable material. Within the barrel 17 is a coiled spring 21, which surrounds the stem 18 and bears at one end against the bottom of the barrel and at the other end against the follower, said spring being normally compressed, so that it gives the follower a constant tendency to follow up a body of sand 22, which is placed in the tube 14.

Figure 4:
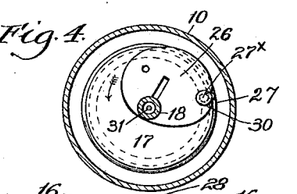
Figure 5:
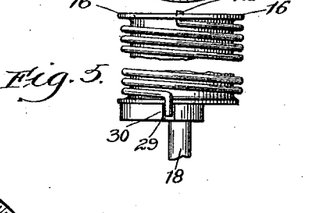
Fig. 5 is an elevation of the mainspring of the device and its accessories.

The interior of the tube 14 is divided by a diaphragm 23 into two chambers A and B, which communicate through an opening 24, formed through the diaphragm 23, said opening being under the control of a valve 25. In the initial condition of the device the chamber B is empty and the chamber A is filled with sand, which holds the follower 19 in the position shown in Fig. 2 and the spring 21 compressed. When the opening 24, through which the chambers A and B communicate, is uncovered by the valve 25 and the receptacle tipped to pouring position, the sand will run from the chamber A into the chamber B, and the follower 19, under the influence of the spring 21, will follow up the body of sand. A continuation of this movement of the follower will cause its stem 18 to be disengaged from a latch 26, which is pivoted at 27× to the under side of the barrel 17, and when the latch is thus freed it will permit the mainspring 27 of the device to recoil, and in doing so break the shell 10. This mainspring preferably consists of a wire which is coiled tightly around the barrel 17, has one of its ends 28 inserted in a perforation in the upper flange 16 of the barrel, and has its other end 29 in engagement with a shoulder 30 on the latch 26. This arrangement is such that so long as the latch is held in the position shown in Figs. 2, 4, and 5 its shoulder 30 will be in engagement with the end 29 of the spring and hold it tightly coiled, but as soon as the stem 18 of the follower is withdrawn from engagement with the latch the latch will be unrestrained and the end 29 of the mainspring will be released, thereby permitting the spring to recoil, as aforesaid. It is this action which is herein spoken of as the "firing" of the device.

The quantity and the degree of fineness of the sand used, its avenue of escape, and the length of the stem 18 of the follower are all such that the withdrawal of the stem from engagement with the latch 26 will be accomplished in about the same length of time as is required to completely empty the receptacle of its contents. Theoretically both operations should be accomplished in exactly the same length of time, but in order to insure the complete emptying of the receptacle I prefer in practice to so construct and proportion the parts that the firing of the device will require a slightly-greater length of time than does the emptying of the receptacle. As stated in the preliminary part of this specification, it is sometimes necessary that the operation of the time mechanism shall be arrested before it has operated this definite length of time. This result will follow automatically by reason of the fact that while the sand is sufficiently mobile to flow from one of the chambers to the other when the receptacle is tipped to a pouring position it is not sufficiently mobile to do so while the receptacle is in an upright position, even under the influence of the spring 21. Actual practice has demonstrated the fact that whenever the bottle is tipped to pouring position and the opening 24 is uncovered the sand will flow from one chamber to the other and as soon as the bottle is returned to upright position the flow of the sand will cease.

It is necessary, of course, to provide means for preventing the operation of the time mechanism while the goods are stored or in transit or are being handled for any purpose that does not have for its object an alteration in the quantity of liquid contained in the receptacle. To this end the valve 25 is placed under the control of the operator to the extent that the opening 24 may be uncovered whenever the discharge-opening of the receptacle is uncovered, and vice versa, but it is equally necessary that the construction be such that the operator cannot cover the opening 24 while the discharge-opening of the receptacle is uncovered. In order to accomplish this, I prefer to carry the stem 31 of the valve 25 through the follower and its stem and secure its lower end by means hereinafter described to the shell 10, and I prefer to so associate the chambers A and B with the stopper 12 that they will move together. In order to accomplish this latter, the stopper in provided on its under side with a tubular extension 32, in which the tube 14 is permanently secured, a liquid-tight joint being made between the shell 10 and the tube 32 by a packing 33, arranged in an annular groove in the exterior of the tube. With this arrangement the valve 25 will bear a fixed relation to the receptacle, while the diaphragm 23, through which the opening 24 is made, will be movable with the stopper 12, and the parts are so proportioned that by moving the stopper inward far enough to uncover the discharge-opening of the receptacle the diaphragm 23 will be moved away from the valve 25 far enough to uncover the opening 24, and vice versa.

The valve-stem 31 is secured at its lower end to a part which is in the nature of a tube 34, closed at one end and having external flanges 35 and 36, the latter of which is of larger diameter than the former and of slightly less diameter than the interior of the shell 10. To this part and within the groove formed by the flanges 35 and 36 are secured a flexible diaphragm 37, preferably of leather or rubber, and a spring 38, which consists of a piece of wire coiled in a single plane and having its inner end secured to the tube 34.

Figure 2:
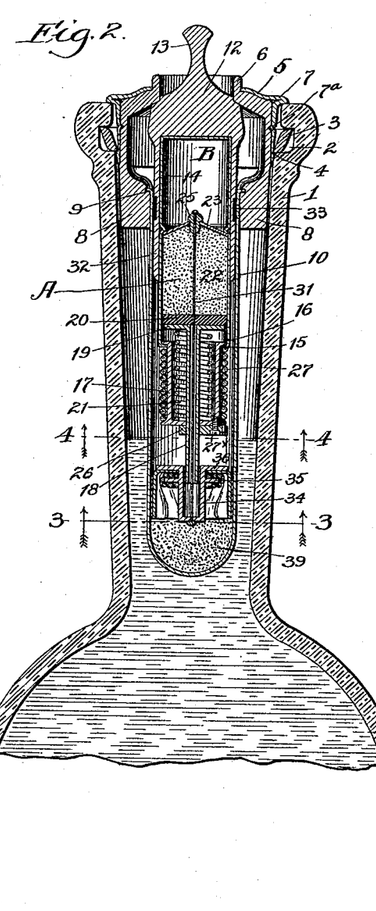
Fig. 2 is a vertical section thereof on the line 2 2, Fig. 1.
Figure 3:
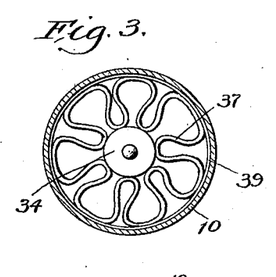
Figs. 3 and 4 are horizontal sections thereof on the lines 3 3 and 4 4, respectively, Fig. 2, looking in the direction of the arrows.

In assembling the parts the diaphragm 37 is folded into plaits, as shown more clearly in Fig. 3, and the spring is compressed within it, as shown more clearly in Fig. 2, the parts being held in this condition by a band 39, of paper or some other material whose strength will be materially lessened when saturated. When the parts are thus arranged, they will fit the interior of the shell 10 sufficiently tight to retain the position shown in Fig. 2 and hold the valve-stem 31 with sufficient firmness to maintain the described fixed relation between the valve 25 and the shell 10. Within the shell 10, preferably below the parts just described, is a quantity 39 of coloring-matter or some other foreign substance, which if mixed with the contents of the receptacle would destroy its commercial value.

Figures 6, 7, 8:
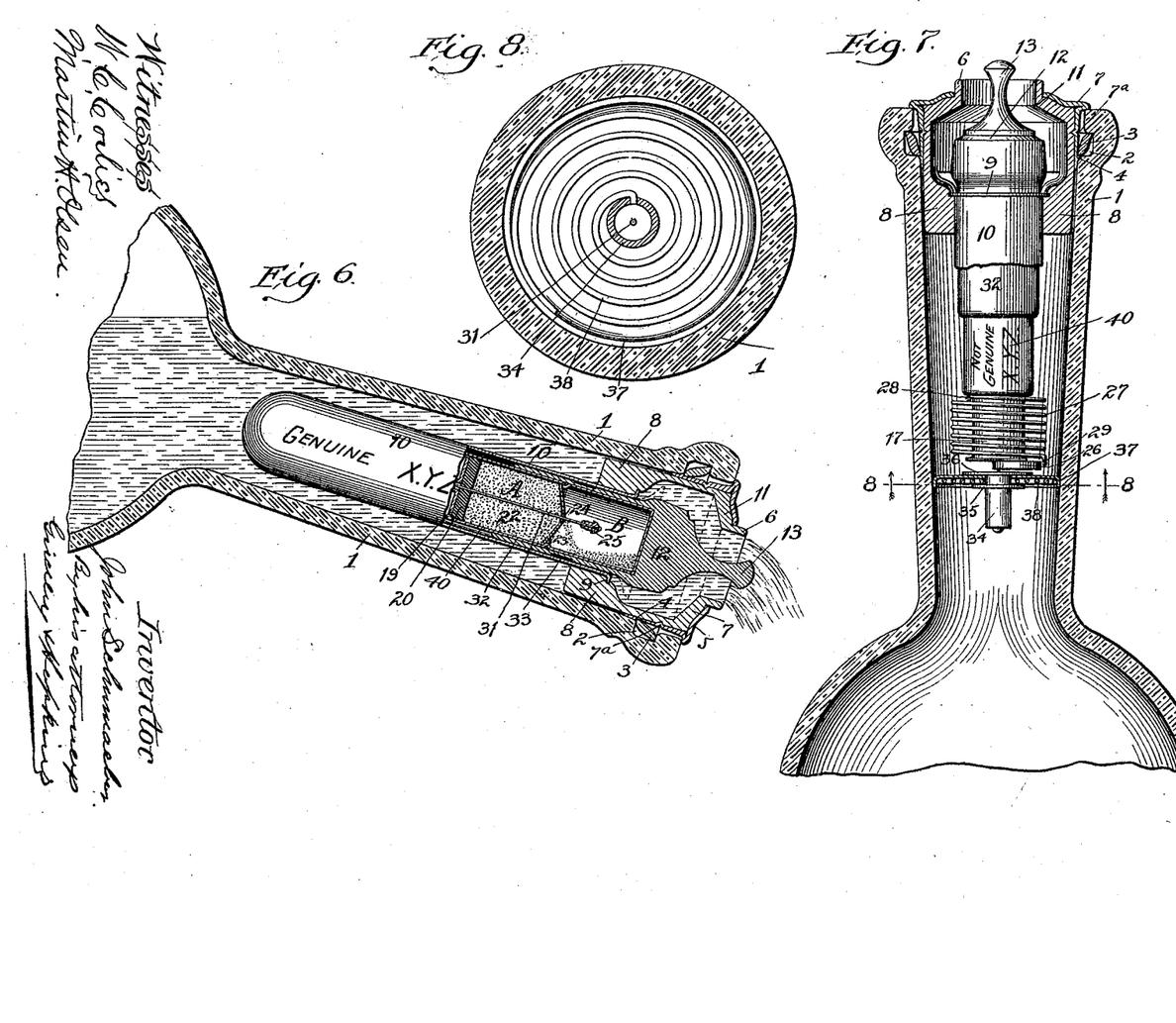
Fig. 6 is a sectional elevation showing the receptacle tipped and the parts in the positions that they occupy when the discharge-opening of the receptacle is opened.
Fig. 7 is a sectional elevation showing the parts in the positions that they occupy after the time mechanism has operated the definite length of time aforesaid and the device has fired.
Fig. 8 is an enlarged horizontal section thereof on the line 8 8, Fig. 7, looking in the direction of the arrows.
Figure 7A:
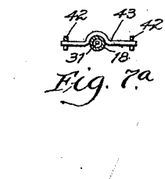
Figures 9, 11, 12, 13:
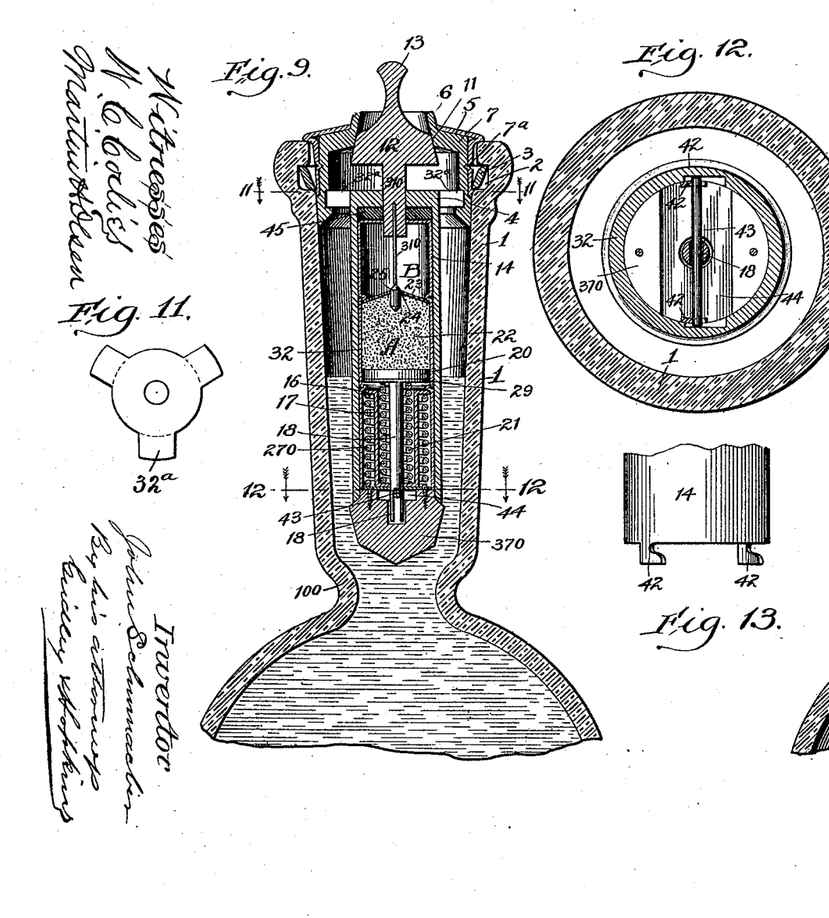
Figs. 9 and 10 are vertical sections of the upper portion of a bottle and of a device embodying some features of the invention in place therein, Fig. 9 showing the parts in their initial positions and the discharge-opening closed and Fig. 10 showing the parts in the positions that they occupy after the device is fired.
Fig. 11 is a horizontal section thereof on the line 11 11, Fig. 9, looking in the direction of the arrows.
Fig. 12 is an enlarged horizontal section thereof on the line 12 12, Fig. 9, looking in the direction of the arrows.
Fig. 13 is an elevation of a fragment of one of the parts.
Figure 10:
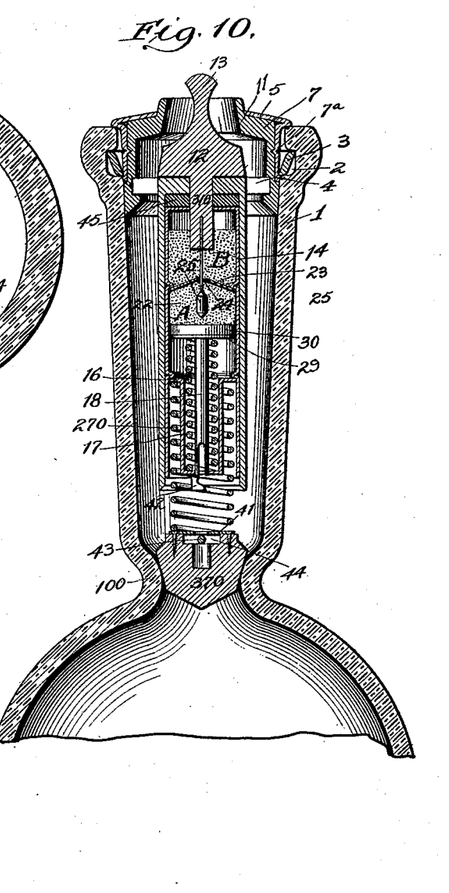

This completes the description of the preferred form of the device. Its operation is as follows: So long as the discharge-opening of the receptacle is closed by the stopper 12 the opening 24 will be closed by the valve 25, and the receptacle may be turned upside down or handled to any desired extent without any of the sand escaping from chamber A. As soon, however, as the stopper is moved far enough to uncover the discharge-opening of the receptacle, the opening 24 will have been uncovered, and if while in these positions the receptacle be tipped its contents will pour out of the discharge-opening, and at the same time the sand will run from chamber A into chamber B, as shown in Fig. 6. The spring-actuated follower 19, under the influence of the spring 21, follows up the escaping sand, and in doing so the position of the stem 18 with relation to the latch 26 is changed. When the stem 18 has been moved far enough to disengage the latch 26, the latter, being free from restraint, will permit the mainspring 27 to suddenly recoil, and in doing so shatter the frangible shell 10. This has the effect of depositing the fragments of the shell in the receptacle, removing the inscription which attested the genuineness of the contents of the receptacle and disclosing another inscription 40, which was concealed by the shell, and proclaims the contents of the receptacle to be not genuine, precipitates the coloring-matter or other foreign substance 39, so that the commercial value of any liquid remaining in the receptacle will be completely destroyed, and exposes the paper-bound diaphragm 37. So long as the paper is dry it will confine the diaphragm and the spring, as shown in Figs. 2 and 3, but as soon as it is wet its strength is destroyed and the spring 38 will uncoil and open up the diaphragm, as shown in Figs. 7 and 8, the diaphragm being of such diameter that it will act as a valve and completely close the neck of the receptacle. In this the preferred form of the invention there are at least five safeguards against the reuse of the receptacle—viz., the fragments of the shell 10, the inscription 40, which was disclosed by the removal of the shell, the foreign substance 39, the diaphragm-valve 37, and the exposure of the working parts of the device to view and to contact with any liquid which the receptacle may contain. I prefer to use all of these safeguards, but I desire to have it understood that a device which includes only one of them is within the scope of my invention in its broadest aspect. Accordingly, I have shown in the drawings modifications in the character of the device which is acted upon by the mainspring, modifications in the character of the mainspring and in the means for confining it, modifications in the escapement which determines the length of time that must elapse before the mainspring performs its function, modifications in the construction of the time mechanism as a whole, modifications in the means under the control of the operator for closing the discharge-opening of the receptacle, modifications in the means for connecting this closure with the time mechanism so that the time mechanism will be prevented from operating under the conditions already described, and modifications in the construction of many of the parts of the device.

All of the details in the construction of the devices shown in Figs. 9 to 26, inclusive, need not be particularly described in this specification, since they are described and claimed in other applications of even date herewith.

In all of the figures of the drawings similar parts bear similar reference-characters.

The device shown in Figs. 9 to 13, inclusive, differs from that shown in Figs. 1 to 8, inclusive, in the following respects: The tube 32, in which the tube 14 is secured, is not connected with the stopper 12, but is connected to the ring 7 by means of radial arms $32^a$, so that in this form of the invention the said tube 32 and all the parts contained within it bear a fixed relation to the receptacle. The frangible shell 10 is omitted, as also are the inscriptions borne by it and by the tube 14. The working parts are nevertheless inclosed liquid-tight, this being accomplished by making the tube 32 of sufficient length and by so arranging the valve 370 that it closes its lower end. The mainspring 270, instead of being put under tension by coiling it tightly, is put under tension by compressing it endwise, it being confined between the flange 16 of the barrel 17 and a plate 41, which is secured to the top of the valve 370 and is held normally in the position shown in Fig. 9 by the following means: The tube 14 is provided at its lower end with a pair of hooks, providing shoulders 42, located diametrically opposite each other. Upon these shoulders rest the ends of a bar 43, which passes through a slot formed through the stem 18 of the follower, whereby it is held in position on said shoulders or hooks so long as the stem of the follower remains in engagement with it. This bar is located beneath the plate 41, the top of the valve 370 being provided with a recess 44 for containing it and permitting its necessary lateral movement. While the parts are in the positions shown in Fig. 9 the bar 43 rests upon the lugs 42, and, notwithstanding the continual pressure of the spring 270 upon it, cannot disengage from the shoulders because of the presence of the stem 18 of the follower, which prevents its lateral movement, but as soon as the stem of the follower has withdrawn from engagement with it there will be nothing to restrain its lateral movement, and under the influence of the spring it will be forced off of the shoulders 42 and the valve 370 will be forced to the seat 100, thereby permanently closing the receptacle against either the admission or discharge of liquid. In this form of the invention the valve 25 is connected with the stopper 12 by means of a stem 310, which passes through the opening 24 loosely and through an opening formed in the upper ends of the tubes 14 and 32, the joint around the stem 310, where it passes through the ends of these tubes, being made liquid-tight by a packing 45.

The details in the construction of the device shown in Figs. 9 to 13, inclusive, that are not claimed in this application are claimed in an application of even date herewith, Serial No. 595,141.

Figure 14:
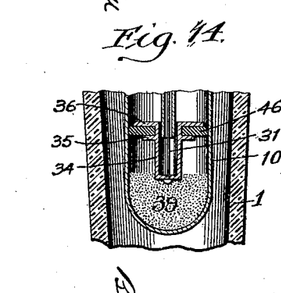
Fig. 14 is a vertical section of a fragment of the neck of a bottle and a fragment of a device embodying some features of the invention.

The construction shown in Fig. 14 differs from that shown in Figs. 1 to 8, inclusive, in that there is no valve. In order to sustain the valve-stem 31, a rubber disk 46 is arranged between the flanges 35 36, said disk being of sufficient diameter to fit the interior of the shell 10 with sufficient friction to hold the parts 34 35 36 in place as against any pressure that will be put upon it by the stem 31.

Figure 15:
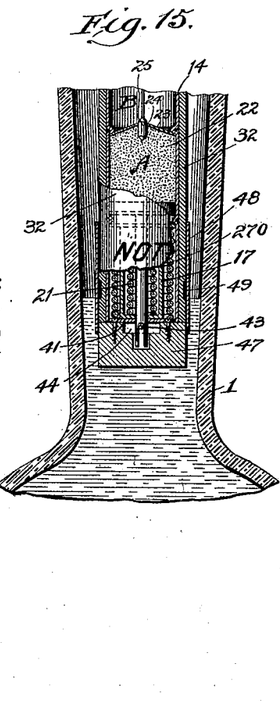
Fig. 15 is a vertical section of a fragment of the neck of a bottle and a fragment of a device embodying some features of the invention, the parts being shown in their initial positions.
Figure 16:
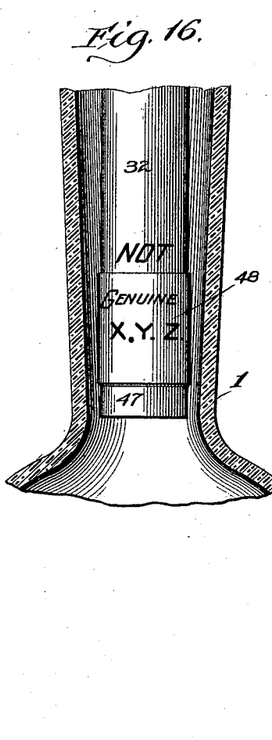
Fig. 16 is a vertical section of a fragment of the neck of a bottle and an elevation of a portion of the device shown in Fig. 15, the parts being shown in the positions that they occupy after the device is fired.

The construction shown in Figs. 15 and 16 differs from that shown in Figs. 9 to 13 in that no valve is used. In place of it the plate 41 is secured to a block 47, to which latter is secured a sleeve 48, which surrounds and fits snugly the tube 32, the joint between them being made liquid-tight by a packing 49, arranged in a groove in the tube 32. The exterior of the sleeve 48 bears an inscription attesting the genuineness of the contents of the receptacle, and in its normal position the sleeve 48 covers the word "Not" on the exterior of the tube 32, the arrangement being such that when the device is fired the sleeve 48 will be shifted so as to uncover the word "Not," which will then be read in connection with the inscription on the sleeve itself and indicate that the contents of the receptacle is not genuine.

The details in the construction of the device shown in Figs. 15 and 16 that are not claimed in this application are claimed in another application of even date herewith, Serial No. 595,141.

Figure 17:
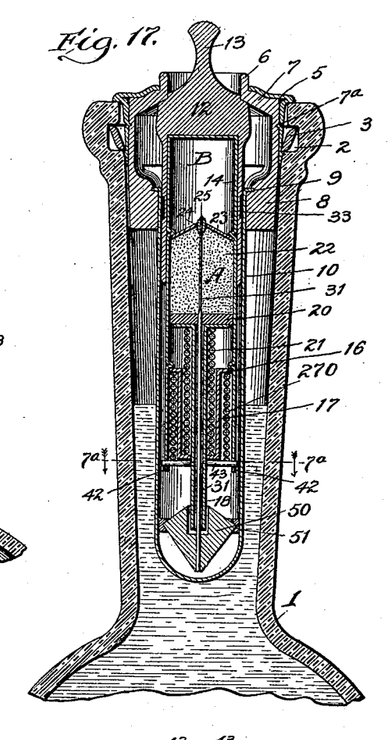
Fig. 17 is a vertical section of the upper portion of a bottle and of a device embodying some features of the invention in place therein, the parts being shown in their initial positions and the discharge-opening of the bottle closed.
Figures 18, 19, 20, 21, 22:
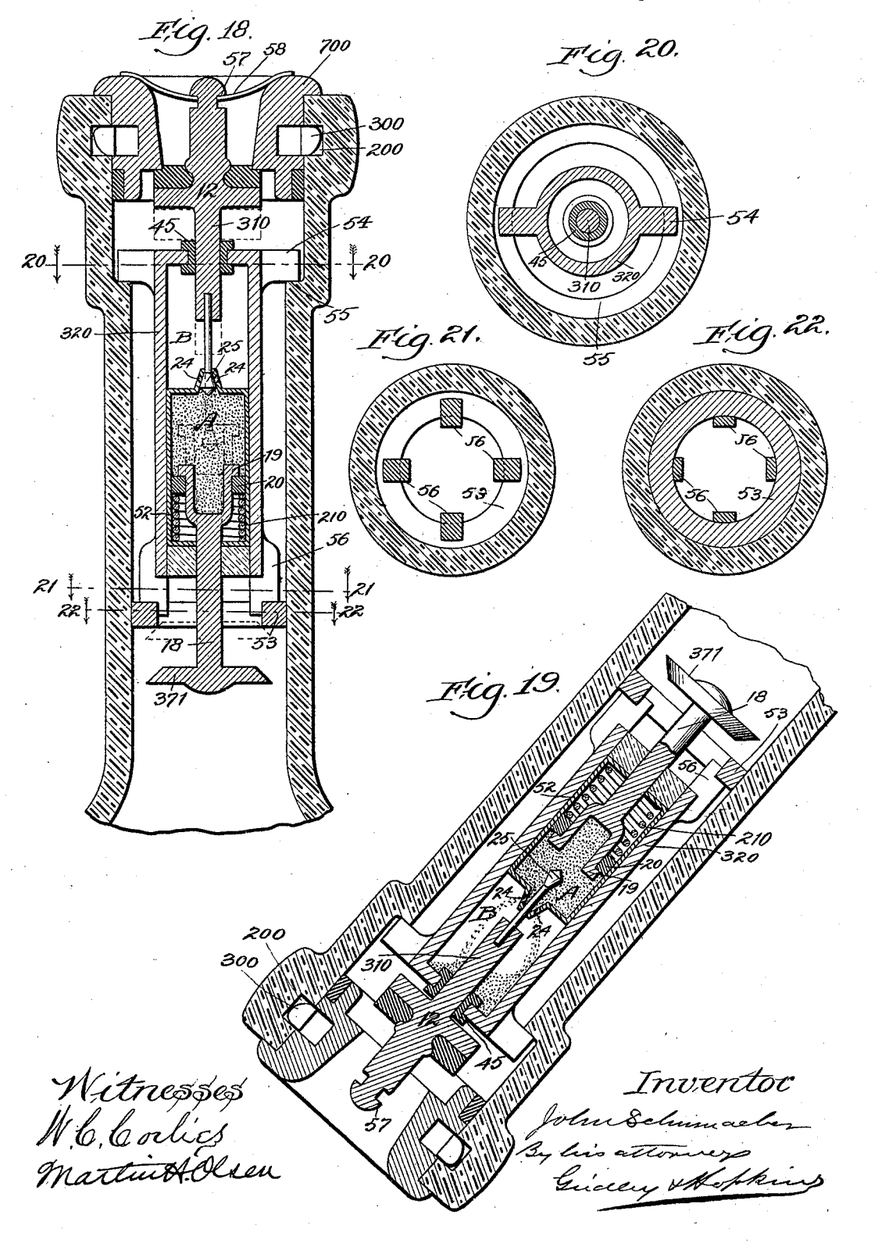
Fig. 18 is a vertical section of the neck of a bottle and of a device embodying some features of the invention in place therein, the parts being shown by full lines in their initial positions and the discharge-opening of the bottle closed and by dotted lines in the positions that they occupy after the device has fired.
Fig. 19 is a similar view showing the bottle tipped and the parts in the positions that they occupy when a portion of the contents of the bottle has been discharged.
Figs. 20, 21, and 22 are horizontal sections thereof on the lines 20 20, 21 21, and 22 22, respectively, Fig. 18, looking in the direction of the arrows.

The construction shown in Figs. 17 and 17ª has some features in common with all of the constructions already described. Its principal difference is that it has a projectile 50, which is sustained within the shell 10 by a friction-ring 51, preferably of rubber, and in turn sustains the valve-stem 31. This arrangement is such that when the device is fired the mainspring 270 will throw the projectile with sufficient force to break the shell 10 and to break the receptacle itself.

In all of the devices already described and in the device shown in Figs. 23 to 26, inclusive, the recoil of the mainspring is instantaneous and takes place at the expiration of the definite length of time during which the time mechanism is arranged to operate; but in the device shown in Figs. 18 to 22, inclusive, only a single spring 210 is used for performing the functions of the two springs of the devices already described. This spring bears at one end against the follower and at the other end against the end of a sheet-metal shell 52, which is closed at both ends, so as to provide the chamber A and a feature which is the equivalent of the barrel 17, already described. In this form of the invention the valve 371 is secured directly to the stem 18 of the follower, so that as the follower moves the valve moves, the arrangement being such that when the time mechanism has operated the required length of time the valve 370 will have been brought to its seat upon a ring 53. The shell 52 is permanently secured in a tube 320, which is closed at both ends, save for an opening at top, through which passes the stem 310 of the valve 25, and an opening at bottom, through which passes the stem 18 of the follower. The tube 320 is provided at top with radial arms 54, which rest upon a shell 55, formed on the interior of the receptacle, and at bottom with legs 56, which rest upon the ring 53, the arms 54 and legs 56 being permanently secured by glass-cement or other suitable means to the parts with which they respectively have contact. The length of the tube 320 is such that it provides a chamber B, into which the sand may run from the chamber A through an opening or openings 24, with which the top of the shell 52 is provided. In this form of the invention the stopper 12 and valve 25 are directly connected, so that they move together, and in order to lock the stopper in closed position its stem is provided with a reduced portion 57, which is engaged by a yoke 58, that spans the discharge-opening and rests upon a ring 700, which corresponds in many respects with the ring 7 already described. This ring 700 is secured in place by a spring-ring 300, which occupies a groove in the ring 700 and has laterally-projecting ends that occupy a groove 200 in the neck of the receptacle.

The details in the construction of this device that are not claimed in this application are claimed in an application of even date herewith, Serial No. 595,142.

In the form of the invention shown in Figs. 23 to 26, inclusive, there is a mainspring 271, which is similar to the mainsprings 27 and 270 in that it is held under tension until the time mechanism has operated the definite length of time aforesaid, whereupon it recoils and performs its function. Strictly speaking, the springs 27 and 270 form no part of the "time mechanism," so called, since they do not in any way enter into its operation, but are simply controlled by it; but the springs 21 and 210 are parts of the time mechanism, since they provide the power that is resisted by the escapement, very much as the mainspring of a watch provides power that is resisted by the escapement. Thus in the forms of the invention already described the power for operating the time mechanism is derived from a part of the time mechanism itself, but in the form of the invention shown in Figs.

Figure 23:
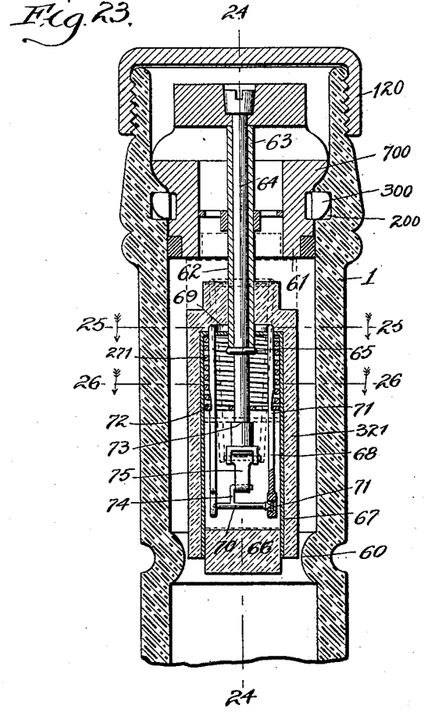
Fig. 23 is a vertical section of the neck of a bottle and of a device embodying some features of the invention in place therein, the parts being shown by full lines in their initial positions and by dotted lines in the positions that they occupy after the device has fired, the plane of the section being indicated by the line 23 23, Fig. 24.
Figure 24:
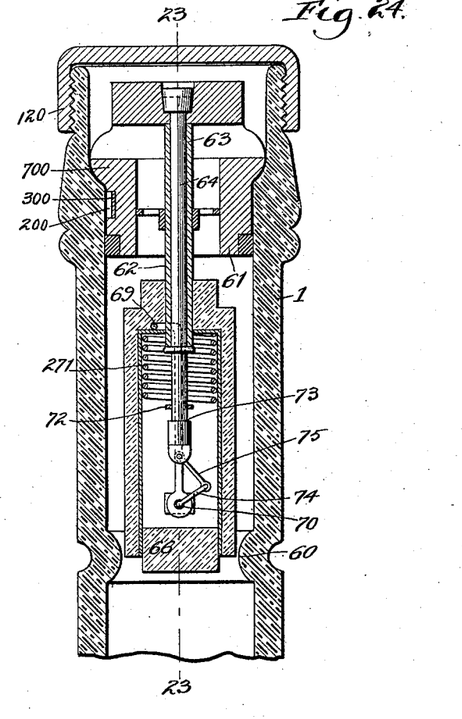
Fig. 24 is a vertical section thereof on the line 24 24, Fig. 23.
Figure 25:
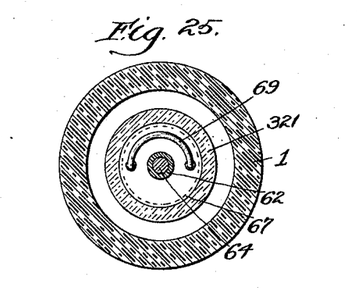
Figs. 25 and 26 are horizontal sections thereof on the lines 25 25 and 26 26, respectively, Fig. 23, looking in the direction of the arrows.
Figure 26:
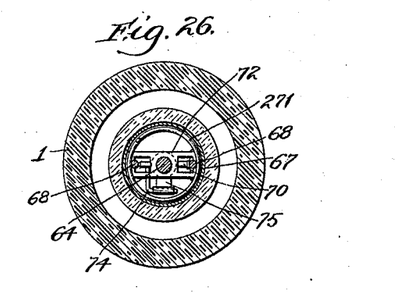

23 to 26 the power is derived from the force of the liquid flowing through the neck of the receptacle. In these figures, 321 represents a hollow shell adapted to serve as a double valve, and 60 and 61 are two valve-seats, between which it is adapted to oscillate, being guided in its movements by a fixed stem 62, which is made up of a tube 63 and a rod 64, fitting within the tube and having a shoulder 65, which bears against the end of the tube and prevents the rod from being withdrawn. The valve is hollow, and the stem 62 passes through one end of it and terminates within it, the valve being made of such material and of such construction that it is buoyant and will float, even with its contained parts. Preferably it is made of a piece of cork hollowed out from one end and having its opening closed by means of a plug 66, permanently secured in it. Within it is permanently secured a shell 67, through the top of which are formed two openings, located diametrically opposite each other, for the passage of two spring-arms 68, which are both formed of a single piece of material having its central portion 69 bent to pass the stem 62, as shown in Fig. 25. These spring-arms are so constructed that they have a tendency to approach each other and assume positions indicated by dotted lines in Fig. 23, but normally they are held apart and in positions shown by full lines by means of a shaft 70, one end of which has a pivotal bearing in one of the arms 68, and the other end of which is provided with a drill-point that bears against a thin diaphragm 71, arranged in an eye in the other of the arms 68. This diaphragm may be made of mica, celluloid, sheet metal, or any other suitable material and is intended to resist the approach of the arms until it is punctured by the drill-point of the shaft 70, whereupon the arms will assume the positions indicated by the dotted lines. This disengages shoulders 71 on the arms from a follower 72, against which bears one end of the spring 271, the other end of which bears against the valve, whereupon the spring expands, bringing the follower 72 into contact with a shoulder 73, formed on the stem 64. The expansion of the spring being thus resisted in one direction by the stem 64, its expansion in the other direction, acting upon the valve, will force it against its seat 61, as indicated by the dotted lines, and there permanently hold it.

The mechanism for causing the puncture of the diaphragm consists simply of a crank-arm 74, carried by the shaft 70, and a link 75, pivotally connected at one end to said crank-arm and at the other end to the lower end of the stem 64. The stem being stationary, it follows that a to-and-fro movement of the valve from the position shown by full lines to that indicated by dotted lines and back will cause the partial rotation of the shaft 70, and this partial rotation repeated a sufficient number of times will cause the drill to perforate the diaphragm. While the liquid is flowing through the discharge-opening of the receptacle in either direction the valve 321, being buoyant, will keep up this to-and-fro movement between the seats 60 and 61, which movement is due partly to gravity and the weight of the liquid upon the valve and partly to the buoyancy of the valve itself. Assuming the parts to be in the positions shown by full lines, if the receptacle be inverted the gravity of the valve and its contained parts and the weight of the liquid upon the bottom of it will force it to its seat 61, as indicated by dotted lines, and all of that part of the neck of the receptacle which is then above said seat 61 will fill with liquid. When this takes place, the buoyancy of the valve, aided by atmospheric pressure, will cause it to move away from its seat 61 and back to the position shown by full lines, whereupon the liquid between the two valve-seats will escape and the valve will again be moved to the dotted position. These movements will be repeated so long as the receptacle is held in pouring position. It is possible to ascertain with sufficient exactness how many of these movements will be imparted to the valve in emptying a given quantity of liquid under given conditions, and it is also possible to so construct the working parts of the device that the diaphragm will be punctured by any desired number of movements of the drill that are thus imparted to it by the movement of the valve. It therefore follows that the device may be so constructed that it will close the bottle within a short time after the contents of the bottle have been completely emptied, and this time may be calculated with sufficient exactness for practical purposes.

Liquid flowing through the discharge-opening of the receptacle in either direction will cause the above-described movements of the valve, and it therefore follows that it is not necessary to time the closing of the valve with any great exactness. For example, let it be assumed that in emptying the receptacle the valve will have seventy-five to-and-fro movements and let it be assumed that the diaphragm and the drill are such that the diaphragm will be punctured by one hundred movements. If a sufficient quantity of liquid be introduced into the receptacle to produce these seventy-five movements, the diaphragm will be perforated thereby and the valve will be seated and permanently close the receptacle and prevent the liquid that was introduced from being discharged. On the other hand, suppose that only a sufficient quantity of liquid is run in to produce half this number of movements. It is true that this same quantity of liquid may be discharged from the receptacle, but as soon as it is charged the valve will close. This, however, is not a serious objection, because it is such a small quantity (one-sixth of the capacity of the bottle) that it would not pay to introduce it.

120 is an auxiliary closure, under the control of the operator, for closing the discharge-opening of the receptacle and corresponding in many respects with the stopper 12, already described.

The details in the construction of this device that are not claimed in this application are claimed in an application of even date herewith, Serial No. 595,143.

In all forms of the device I prefer to make all parts that are exposed to the liquid of material other than metal. The parts 7 8 12 13 32 47 and the exposed portion of 310 are preferably of wood; 10, 48, and 320 of glass; 66, 321, and 370 of cork.

As before stated, with some classes of goods it is necessary that the device be provided with means for arresting its own operation, for the reason that the intervals during which the discharge of the contents of the receptacle is interrupted may extend through days or weeks, or even months; but with some classes of goods—as, for example, beer, champagne, and other effervescent liquids—the complete emptying of the receptacle never extends over any very considerable period of time. Frequently it is accomplished within a very few minutes, for the reason that when the receptacle is once opened the contents will soon spoil if allowed to stand. With goods of this sort it is not absolutely necessary that the device be provided with means for arresting its own operation.

The object of the invention will be accomplished if the device instead of being arranged to operate for a length of time equal to that required for emptying the receptacle be arranged to operate a length of time which under ordinary conditions will cover the length of time consumed in emptying the receptacle of goods of the class in question, including the intervals during which the pouring is interrupted. For example, if the device is to be used in a champagne-bottle and is arranged to operate continuously for a period of, say, a few hours ample time will be allowed for completely emptying the bottle, and at the same time the device will accomplish the object of the invention, since it will fire at the expiration of the few hours aforesaid. It is true that until the device fires the bottle may be repeatedly refilled and emptied, but if only the limited time of a few hours be allowed for the purpose it cannot be repeatedly refilled and emptied, so as to defraud the purchaser or the bottler whose goods the bottle originally contained. I desire to have it understood, therefore, that such a period of time is included by the statement "a definite length of time" used in this specification; but even with this class of goods I prefer to provide the device with means for arresting its own operation, for the reason that by doing so it may be made of minimum size and capacity.

It will be seen that in all forms of the device excepting the one shown in Figs. 23 to 26, inclusive, the device operates only upon the establishing of the conditions that are necessary in order to discharge the contents of the receptacle—that is to say, it will not operate while liquid is being poured into the receptacle; but the device shown in Figs. 23 to 26, inclusive, will operate while liquid is being poured into the receptacle as well as while it is being discharged. Hence it will be seen that in its broadest aspect the invention covers a time mechanism which operates either while the receptacle is being emptied or while the receptacle is being filled.

Having thus described my invention, the following is what I claim as new therein and desire to secure by Letters Patent:

1. In a device for preventing the fraudulent reuse of bottles or similar receptacles, the combination with the receptacle, of time mechanism arranged to operate a definite length of time, means upon which the time mechanism is adapted to operate, and means for preventing the resetting of the time mechanism, substantially as and for the purpose described.

2. In a device for preventing the fraudulent reuse of bottles or similar receptacles, the combination with the receptacle, of time mechanism arranged to operate a definite length of time, means upon which the time mechanism is adapted to operate, and means for preventing the operator from interfering with the operation of the time mechanism, substantially as and for the purpose described.

3. In a device for preventing the fraudulent reuse of bottles or similar receptacles, the combination with the receptacle, of time mechanism arranged to operate a definite length of time, and means upon which the time mechanism is adapted to operate, the time mechanism being provided with means for arresting its own operation before it has operated the definite length of time aforesaid, substantially as and for the purpose described.

4. In a device for preventing the fraudulent reuse of bottles or similar receptacles, the combination with the receptacle, of time mechanism arranged to operate a definite length of time, means upon which the time mechanism is adapted to operate, the time mechanism being provided with means for arresting its own operation before it has operated the definite length of time aforesaid, and means for preventing the operator from interfering with the operation of the time mechanism, substantially as and for the purpose described.

5. In a device for preventing the fraudulent reuse of bottles or similar receptacles, the combination with the receptacle, of time mechanism arranged to operate a definite length of time, means upon which the time mechanism is adapted to operate, the time mechanism being provided with means for arresting its own operation before it has operated the definite length of time aforesaid, and means for preventing the resetting of the time mechanism, substantially as and for the purpose described.

6. In a device for preventing the fraudulent reuse of bottles or similar receptacles, the combination with the receptacle, of a spring, a device upon which it is adapted to operate, time mechanism adapted to operate a definite length of time for holding the spring under tension, and means for preventing the resetting of the time mechanism, substantially as and for the purpose described.

7. In a device for preventing the fraudulent reuse of bottles or similar receptacles, the combination with the receptacle, of a spring, a device upon which it is adapted to operate, time mechanism adapted to operate a definite length of time for holding the spring under tension, and means for preventing the operator from interfering with the operation of the time mechanism, substantially as and for the purpose described.

8. In a device for preventing the fraudulent reuse of bottles or similar receptacles, the combination with the receptacle, of time mechanism arranged to operate a definite length of time, a device upon which the time mechanism is adapted to operate, means under the control of the operator for closing the receptacle, means under the control of the operator for preventing the operation of the time mechanism while the receptacle is closed as aforesaid, and means for preventing the operator from interfering with the operation of the time mechanism when the receptacle is conditioned for the discharge of its contents, substantially as and for the purpose described.

9. In a device for preventing the fraudulent reuse of bottles or similar receptacles, the combination with the receptacle, of time mechanism arranged to operate a definite length of time, means upon which the time mechanism is adapted to operate, auxiliary means under the control of the operator for closing the receptacle, and means connecting the time mechanism and the auxiliary means aforesaid so that when the receptacle is closed by said auxiliary means, the time mechanism will be prevented from operating, substantially as and for the purpose described.

10. In a device for preventing the fraudulent reuse of bottles or similar receptacles, the combination with the receptacle, of time mechanism adapted to operate a definite length of time, means upon which the time mechanism is adapted to operate, and means for preventing the resetting of the time mechanism, said time mechanism including a quantity of a finely-divided, solid substance and a chamber containing said substance and having an opening through which it escapes, substantially as and for the purpose described.

11. In a device for preventing the fraudulent reuse of bottles or similar receptacles, the combination with the receptacle, of time mechanism arranged to operate a definite length of time, means upon which the time mechanism is adapted to operate, means for preventing the resetting of the time mechanism, auxiliary means under the control of the operator for controlling the discharge-opening of the receptacle, and means connecting said auxiliary means with the time mechanism, said time mechanism including a quantity of a finely-divided solid substance, and a chamber containing said substance and having an opening through which it escapes, substantially as and for the purpose described.

12. In a device for preventing the fraudulent reuse of bottles or similar receptacles, the combination with the receptacle, of two communicating chambers, a quantity of a finely-divided solid substance in one of them, a spring-actuated follower controlled by said substance, and a device controlled by the follower, substantially as and for the purpose described.

13. In a device for preventing the fraudulent reuse of bottles or similar receptacles, the combination with the receptacle, of two communicating chambers, a quantity of a finely-divided solid substance in one of them, a spring-actuated follower controlled by said substance, a spring under tension, a device upon which it is adapted to operate when released, and means controlled by the follower for holding the spring under tension, substantially as and for the purpose described.

14. In a device for preventing the fraudulent reuse of bottles or similar receptacles, the combination with the receptacle, of two communicating chambers, a quantity of a finely-divided solid substance in one of them, a spring-actuated follower controlled by said substance, a spring under tension, a device upon which the spring is adapted to operate, a latch engaging the spring and holding it under tension, and a stem carried by the follower and engaging the latch, substantially as and for the purpose described.

15. In a device for preventing the fraudulent reuse of bottles or similar receptacles, the combination of a tube divided on its interior into two communicating chambers, a quantity of a finely-divided solid substance in one of them, a follower controlled by said substance, a spring engaging the follower, a barrel secured to the tube and sustaining the spring, a mainspring coiled around the barrel and secured at one end, a latch pivoted to the barrel and engaging the other end of the spring, a stem carried by the follower and engaging the latch, and a device upon which the mainspring is adapted to operate when released, substantially as and for the purpose described.

16. In a device for preventing the fraudulent reuse of bottles or similar receptacles, the combination with the receptacle, of time mechanism arranged to operate a definite length of time, means for preventing the resetting of the time mechanism, means upon which the time mechanism is adapted to operate, including a displaceable device, and an inscription which is normally covered by said displaceable device and which is uncovered when said device is displaced, substantially as and for the purpose described.

17. In a device for preventing the fraudulent reuse of bottles or similar receptacles, the combination with the receptacle, of time mechanism arranged to operate a definite length of time, means for preventing the resetting of the time mechanism, and means upon which the time mechanism is adapted to operate, said means including a frangible device, substantially as and for the purpose described.

18. In a device for preventing the fraudulent reuse of bottles or similar receptacles, the combination with the receptacle, of time mechanism arranged to operate a definite length of time, means for preventing the resetting of the time mechanism, and means upon which the time mechanism is adapted to operate, including a chamber containing a foreign substance, substantially as and for the purpose described.

19. In a device for preventing the fraudulent reuse of bottles or similar receptacles, the combination with the receptacle, of time mechanism arranged to operate a definite length of time, means for preventing the resetting of the time mechanism, and means upon which the time mechanism is adapted to operate, said means including a valve, substantially as and for the purpose described.

20. In a device for preventing the fraudulent reuse of bottles or similar receptacles, the combination with the receptacle and a device having automatically-operating parts for preventing its reuse, of a liquid-tight inclosure located within the receptacle and inclosing said automatically-operating parts so as to protect them from the liquid, a passage for the liquid being left between the receptacle and the liquid-tight inclosure, substantially as set forth.

21. In a device for preventing the fraudulent reuse of bottles or similar receptacles, the combination with the receptacle, of time mechanism arranged to operate a definite length of time, means upon which the time mechanism is adapted to operate, and a liquid-tight inclosure in which said time mechanism is contained, substantially as and for the purpose described.

22. In a device for preventing the fraudulent reuse of bottles or similar receptacles, the combination with the receptacle, of time mechanism arranged to operate a definite length of time, a spring, means controlled by the time mechanism for holding said spring under tension, and a frangible shell in which the time mechanism is contained, substantially as and for the purpose described.

23. In a device for preventing the fraudulent reuse of bottles or similar receptacles, the combination with the receptacle, of time mechanism, a spring under tension controlled by the time mechanism, and a shell of opaque, frangible material, in which the time mechanism and spring are contained, substantially as and for the purpose described.

24. In a device for preventing the fraudulent reuse of bottles or similar receptacles, the combination with the receptacle, of time mechanism, a spring under tension controlled by the time mechanism, a frangible shell upon which the spring acts, and a foreign substance contained by the shell, substantially as and for the purpose described.

25. In a device for preventing the fraudulent reuse of bottles or similar receptacles, the combination with the receptacle, of time mechanism, a spring under tension controlled by the time mechanism, a valve and a frangible shell containing the valve and spring, substantially as and for the purpose described.

26. In a device for preventing the fraudulent reuse of bottles or similar receptacles, the combination of a shell containing a foreign substance, and means for discharging said substance within the receptacle, substantially as and for the purpose described.

27. In a device for preventing the fraudulent reuse of bottles or similar receptacles, the combination with the receptacle, of a valve, means for holding the valve temporarily unseated, a spring for seating the valve, and means for preventing access to the valve for thereafter unseating it, substantially as and for the purpose described.

28. In a device for preventing the fraudulent reuse of bottles or similar receptacles, the combination with the receptacle, of a displaceable sleeve bearing an inscription, a part surrounded by the sleeve and bearing an inscription which is normally covered by the sleeve, and uncovered when the sleeve is displaced, and means for displacing the sleeve, said means including time mechanism adapted to operate a definite length of time; substantially as and for the purpose described.

29. In a device for preventing the fraudulent reuse of bottles or similar receptacles, the combination with the receptacle, of a tube, a follower arranged therein, means for controlling the position of the follower, a spring engaging the follower, a second spring, means for holding the second spring normally under tension, said means including a displaceable part engaged by the stem of the follower, and movable laterally with relation thereto, a valve for closing the receptacle, and means for preventing the unseating of the valve when once it is seated, substantially as and for the purpose described.

30. In a device for preventing the fraudulent reuse of bottles or similar receptacles, the combination with the receptacle, of a spring, a device upon which it is adapted to operate, an escapement controlling the spring and arranged to operate a definite length of time, and means for preventing the operator from interfering with the operation of the escapement, substantially as and for the purpose described.

JOHN SCHUMACHER.

Witnesses:
L. M. HOPKINS,
N. C. GRIDLEY.